UNITED STATES PATENT OFFICE.

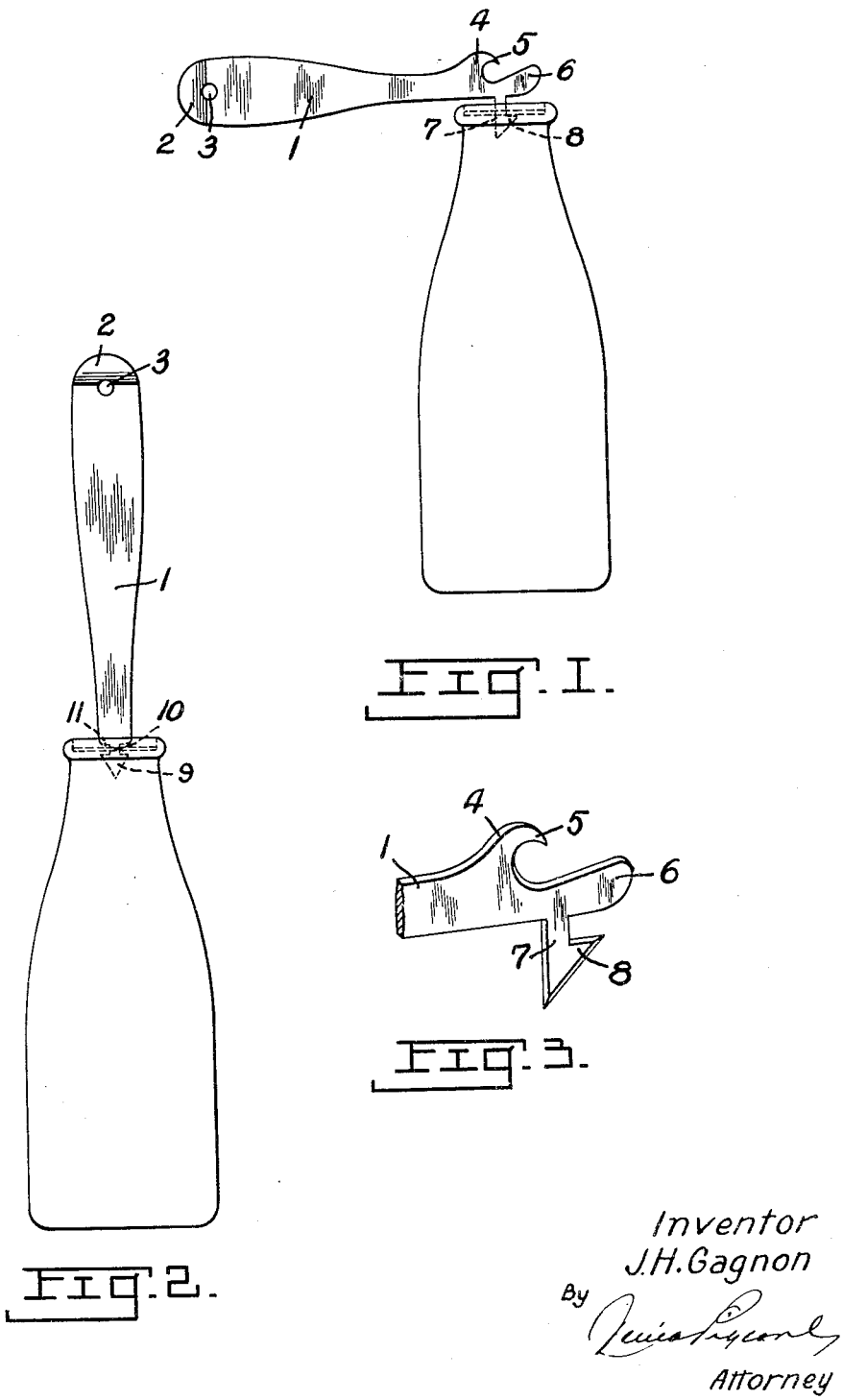

JOSEPH HENRI GAGNON, OF MONTREAL, QUEBEC, CANADA, ASSIGNOR OF TWO-THIRDS TO VICTOR GEOFFRION, OF MONTREAL, QUEBEC, CANADA.

COMBINATION KITCHEN UTENSIL.

1,394,194.  Specification of Letters Patent.  Patented Oct. 18, 1921.

Application filed May 10, 1920. Serial No. 380,277.

*To all whom it may concern:*

Be it known that I, JOSEPH HENRI GAGNON, a British subject, steam-fitter, residing at No. 359 Cadillac street, in the city of Montreal, in the Province of Quebec, in the Dominion of Canada, have invented certain new and useful Improvements in Combination Kitchen Utensils; and I do hereby declare that the following is a full, clear, and exact description of the same.

The present invention relates to improvements in a combination kitchen utensil and its main object is to provide a device of this character whch will be handy and cheap to manufacture.

Another object is to provide a device of this character with a crown cap opener and a milk bottle opener at one end and at the other end provide a can opener.

To better understand the present invention reference should be had to the accompanying drawings in which:—

Figure 1 illustrates a milk bottle, and the invention being in position to remove the cap.

Fig. 2 illustrates a modified form of the invention.

Fig. 3 is an enlarged perspective view of the crown cap remover and of the milk bottle opener, the handle being broken away.

Like numerals of reference indicate corresponding parts in each figure.

In the drawings:—

1 is a handle provided at one end with a can opener 2, said can opener 2 consisting of a flattened portion at the outer edge of the handle and 3 is a hole provided in said handle.

At the other end of said handle 1 is a crown cap remover 4 consisting of an upwardly projecting hook 5 and 6 is a projecting portion which is adapted to rest against the crown cap when it is removed.

Provided under said crown cap remover 4 is the milk bottle opener which consists of a sharp downwardly projecting portion 7, said projecting portion 7 being made so as to form a shoulder 8 which rests against the milk bottle cap after it has been inserted through it. The handle 1 is lowered against the edge of the bottle as disclosed in Fig. 1 and a slight downward movement will remove the cap from the bottle.

In Fig. 2 of the drawings is shown a modified form of the invention which consist of a triangular member 9 which is united to the handle by means of a neck or web 10. On each side of said web 10 is formed a flat portion 11 which should be preferably wider than the triangular member 9, so that when the said triangular member is inserted in the cap of the bottle, the flat portions 11 will serve as a shoulder and prevent further downward movement. By turning the handle 1, the edges on each side of said web 10 will project under the cap portion which has not been cut and thus lock the triangular member 9.

What I claim as my invention is:—

A device of the character described comprising a main body portion having its lower edge located in one common plane, a bottle cap piercer provided at one end of said member in the form of a barb having sharpened cutting edges and a flat edge parallel with the lower edge of the main body, the opposite end of the member constituting a handle whereby the pierced cap is raised upon the downward movement thereof, a portion intermediate the piercer and the handle adapted to engage the rim of the bottle neck to serve as a fulcrum in the cap raising operation, a portion opposite the fulcrum and at the end of the member which carries the piercer overlapping and constituting a guard for the piercer, and an upwardly curved portion on said member substantially directly over the piercer to serve as a thumb piece when the piercer is forced into the cap.

Signed at Montreal, Quebec, Canada, this 12th day of April 1920.

JOSEPH HENRI GAGNON.

Witnesses:
C. PATENAUDE,
M. L. MORSE.